United States Patent [19]

Szpunar

[11] Patent Number: 5,282,720
[45] Date of Patent: Feb. 1, 1994

[54] FAN BLADE RETAINER

[75] Inventor: Stephen J. Szpunar, West Chester, Ohio

[73] Assignee: General Electric Company, Cincinnati, Ohio

[21] Appl. No.: 945,049

[22] Filed: Sep. 15, 1992

[51] Int. Cl.$^5$ ............................................. F01D 5/32
[52] U.S. Cl. ................................ 416/220 R; 416/248
[58] Field of Search ............... 416/219 R, 220 R, 221, 416/248, 500

[56] References Cited

U.S. PATENT DOCUMENTS 4,265,595  5/1981  Bucy, Jr. et al. ............... 416/220 R
4,474,535 10/1984  Dhuic ........................... 416/220 R
4,478,554 10/1984  Surdi ............................. 416/221

Primary Examiner—John T. Kwon
Attorney, Agent, or Firm—Jerome C. Squillaro

[57] ABSTRACT

A rotor blade retention assembly includes a rotor blade having a dovetail mounted in a complementary axial dovetail groove in a rotor disk. A primary blade retainer retains the blade in the groove against axial movement in a first direction. A secondary blade retainer retains the blade in the groove after a predetermined travel of the blade in the first direction upon failure of the primary blade retainer to restrain the predetermined travel.

9 Claims, 6 Drawing Sheets

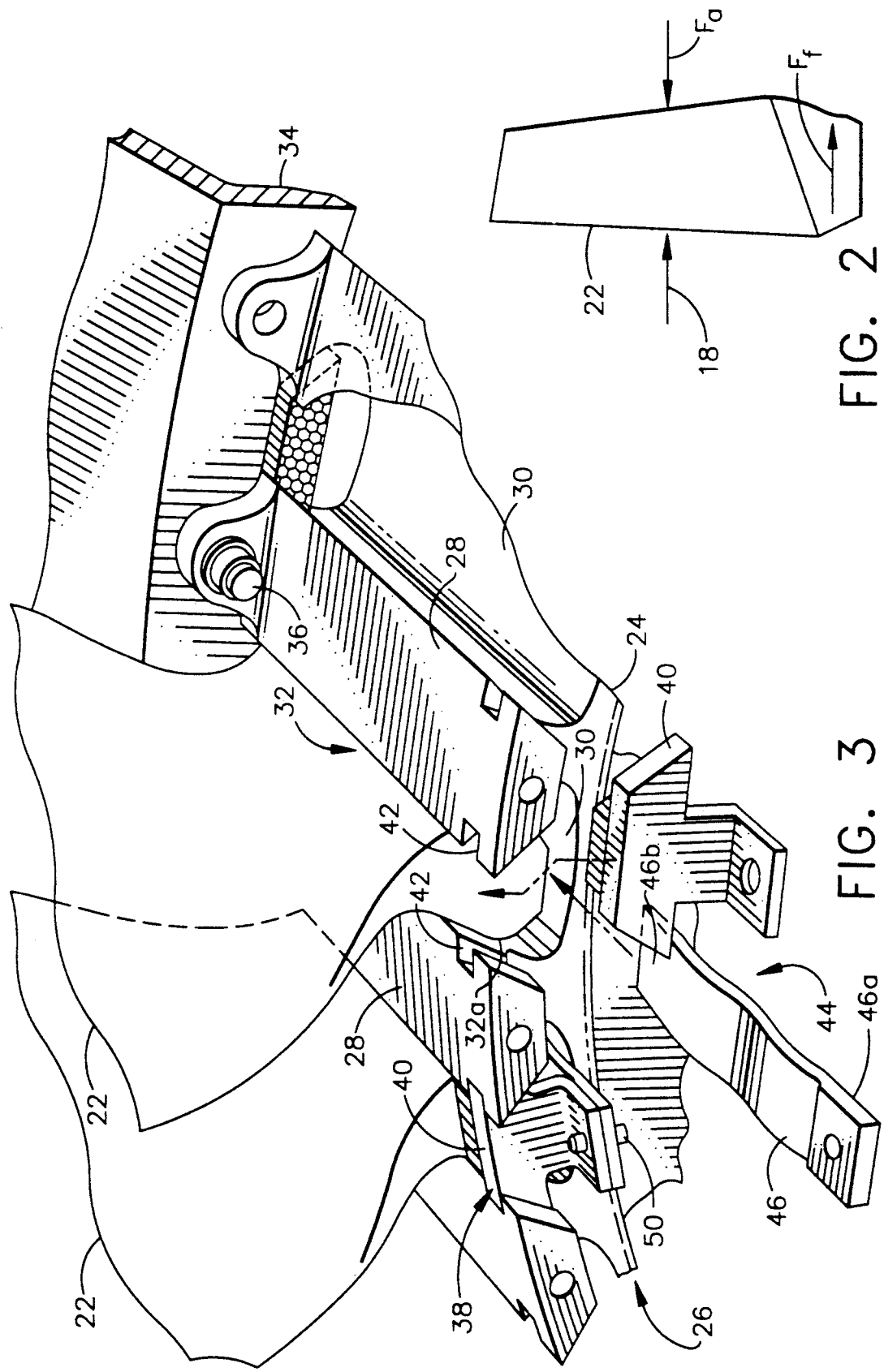

FAN BLADE RETAINER

The present invention relates generally to gas turbine engines, and, more specifically, to an assembly for axially retaining rotor blades in a rotor disk thereof.

BACKGROUND OF THE INVENTION

A turbofan gas turbine engine used for powering an aircraft in flight typically includes a fan assembly having a plurality of circumferentially spaced apart fan blades each having a dovetail disposed in a complementary, axially extending dovetail groove in the perimeter of a rotor disk. The dovetail grooves are defined by dovetail posts and are complementary in configuration with the blade dovetails for radially retaining the blades to the rotor disk. The blades are also axially retained in the rotor disk by conventional forward and aft blade retainers which prevent axial movement of the blades in the upstream and downstream directions.

The normal axial loads carried to the rotor disk by the blade dovetails are relatively small. These loads include primarily the aerodynamic thrust loads developed by the fan blades, and vibratory loads thereof. However, the engine is also subject to ingestion of relatively large birds, or a blade-out occurrence wherein one of the fan blades is severed from the rotor disk, which generates relatively large axial forces upon impact with adjacent blades. The large bird or severed blade is accelerated in the downstream direction by impact with the adjacent blades which imposes a relatively large force in the axial upstream direction.

Accordingly, the forward blade retainer is conventionally designed for accommodating the relatively large axial forces associated with a large bird or blade-out impact which necessarily requires a large forward blade retainer as well as correspondingly sized dovetail posts for reacting the large axial force within suitable stress limits. In turn, this results in an undesirable increase in weight of the fan assembly.

SUMMARY OF THE INVENTION

A rotor blade retention assembly includes a rotor blade having a dovetail mounted in a complementary axial dovetail groove in a rotor disk. A primary blade retainer retains the blade in the groove against axial movement in a first direction. A secondary blade retainer retains the blade in the groove after a predetermined travel of the blade in the first direction upon failure of the primary blade retainer to restrain the predetermined travel.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which:

FIG. 2 is a schematic representation of one of the fan blades illustrated in FIG. 1 showing an exemplary applied force thereon and a reaction friction force.

FIG. 3 is a perspective, partly exploded view showing in more detail the assembly for retaining the fan blades illustrated in FIG. 1 in accordance with one embodiment of the present invention.

DESCRIPTION OF THE PREFERRED EMBODIMENT(S)

Figure 1:
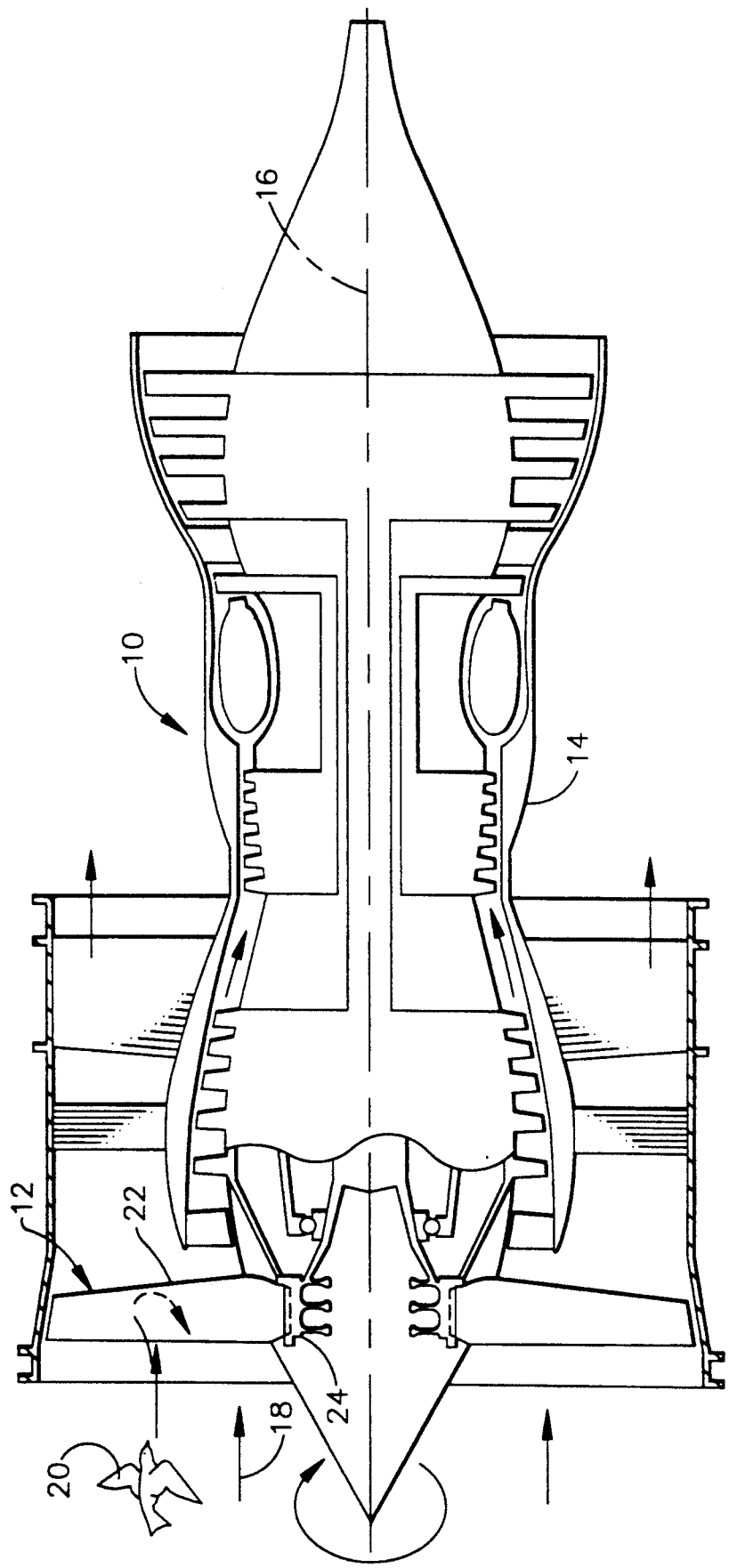
FIG. 1 is an axial centerline schematic representation of an exemplary aircraft turbofan gas turbine engine having a fan blade retention assembly in accordance with one embodiment of the present invention.

Illustrated schematically in FIG. 1 is an exemplary turbofan gas turbine engine 10 effective for powering an aircraft (not shown) in flight. The engine 10 has a fan assembly 12 powered by a conventional core engine 14 both disposed coaxially about an axial centerline axis 16 thereof. During operation of the engine 10, ambient air 18 is drawn in by the fan assembly 12 for generating thrust for powering the aircraft in flight. During takeoff or descent of the aircraft being powered by the engine 10, a relatively large bird 20 may be ingested into the fan assembly 12 which can generate considerable forces which must be suitably accommodated for maintaining effective operation of the engine 10.

More specifically, the bird 20 may impact one or more of the conventional rotor or fan blades 22 which extend radially outwardly from a rotor disk 24. FIG. 2 illustrates schematically one of the fan blades 22 which impacts the bird 20 causing an axially forward or upstream directed transient or impact applied force $F_a$ which tends to move the blade 22 in an upstream direction opposite to the downstream travel of the air 18. This applied force $F_a$ from the bird ingestion is analogous to a similar force effected by a blade-out condition wherein one of the fan blades 22 is severed from the rotor disk 24 and impacts one or more of the adjacent fan blades 22. In both situations, the fan blades 22 must be suitably secured to the rotor disk 24 to prevent their axial ejection therefrom.

More specifically, and referring to FIG. 3, a retention assembly 26 is shown in accordance with an exemplary, first embodiment of the present invention for retaining each of the fan blades 22 to the rotor disk 24. The disk 24 includes a plurality of circumferentially spaced apart conventional dovetail posts 28 with respective pairs of circumferentially adjacent posts 28 defining therebetween a conventional axially extending dovetail groove 30. Each of the plurality of blades 22 includes a conventional axial-entry dovetail 32 at its radially inner end which is complementary in configuration to the dovetail groove 30 and is disposed therein for radial retention by the posts 28. In this exemplary embodiment, each dovetail 32 includes a pair of circumferentially spaced apart dovetail lobes 32a which are radially retained by the adjacent dovetail posts 28. In this way, the centrifugal force generated by the rotating blade 22 is carried through the lobes 32a and into the posts 28 of the disk 24 for radially retaining the blade 22 thereto.

In order to retain each of the blades 22 axially within its respective dovetail groove 30, a conventional aft blade retainer 34 in the form of an annular flange is conventionally fixedly joined to the aft end of the posts 28 by bolts 36 to prevent the blades 22 from moving in the axial aft or downstream direction in the groove 30. To prevent movement of the blades 22 in the forward or upstream direction in the grooves 30, a conventional primary or forward blade retainer 38 is provided. The primary blade retainer 38 includes, in this exemplary embodiment, a conventional retention plate 40 fixedly joined to the rotor disk 24 at the posts 28 for retaining a respective blade 22 in its groove 30 against axial movement in the forward, or first, direction. The retention plate 40 is simply inserted radially upwardly into a pair of complementary slots 42 formed in adjacent posts 28 in a conventional manner.

Figure 4:
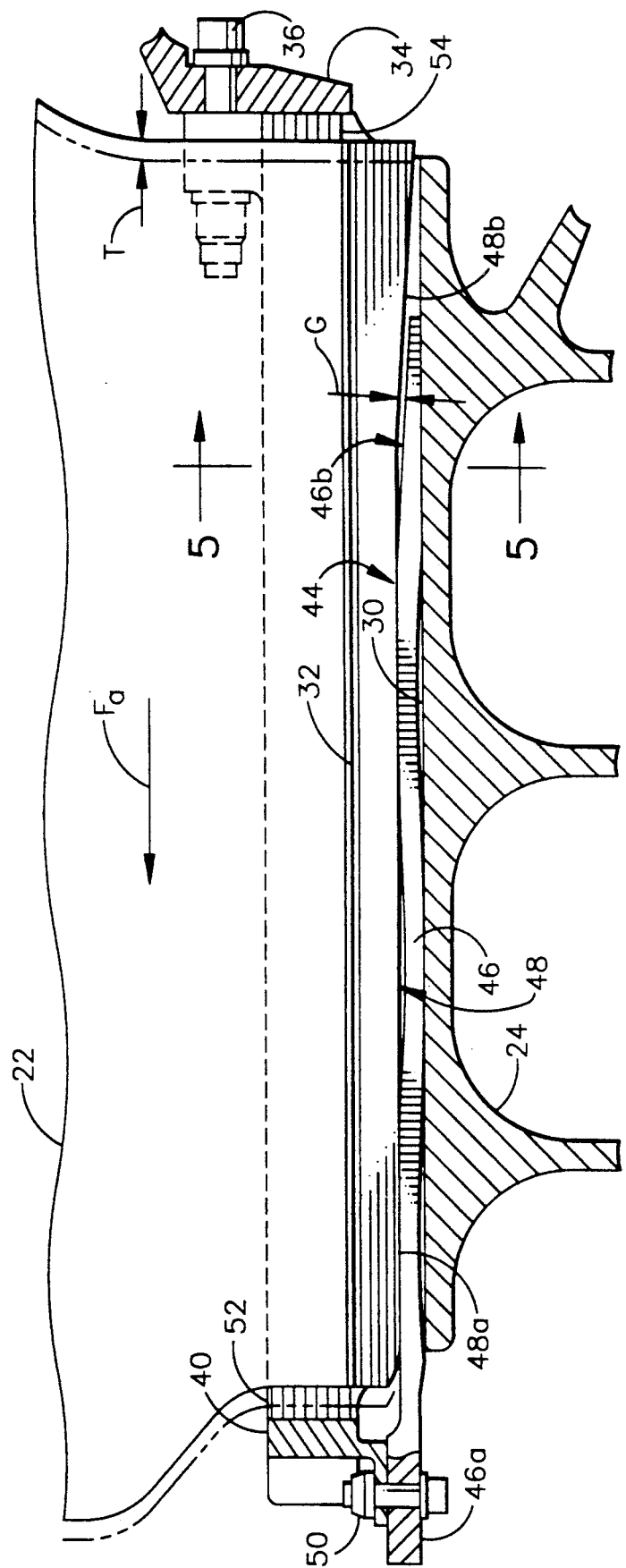
FIG. 4 is an axial, partly sectional side view of the retention assembly illustrated in FIG. 3 for one of the fan blades.

As shown in FIGS. 3 and 4, a secondary blade retainer or means 44 is provided for axially retaining a respective blade 22 in its groove 30 after a predetermined travel T of the blade 22 in the first, upstream direction upon failure of the primary blade retainer 38 to restrain such predetermined travel. In this way, both the primary and secondary blade retainers 38 and 44 may be used in turn to dissipate energy from the transient applied force $F_a$ while ensuring that the blade 22 is axially retained in the groove 30. This allows the primary retainer 38 to be sized smaller than without the secondary blade retainer 44 for reacting the typical axial forces such as those due to thrust and vibration, with the secondary retainer 44 providing additional axial retention for accommodating the transient applied force $F_a$ which may occur with low probability. The resulting retention assembly 26 is therefore lighter in weight since the primary blade retainer 38 and its supporting dovetail posts 28 may be configured for the normal smaller axial forces on the blades 22 instead of increasing their size for accommodating the full transient impact loads as well.

Figure 5:
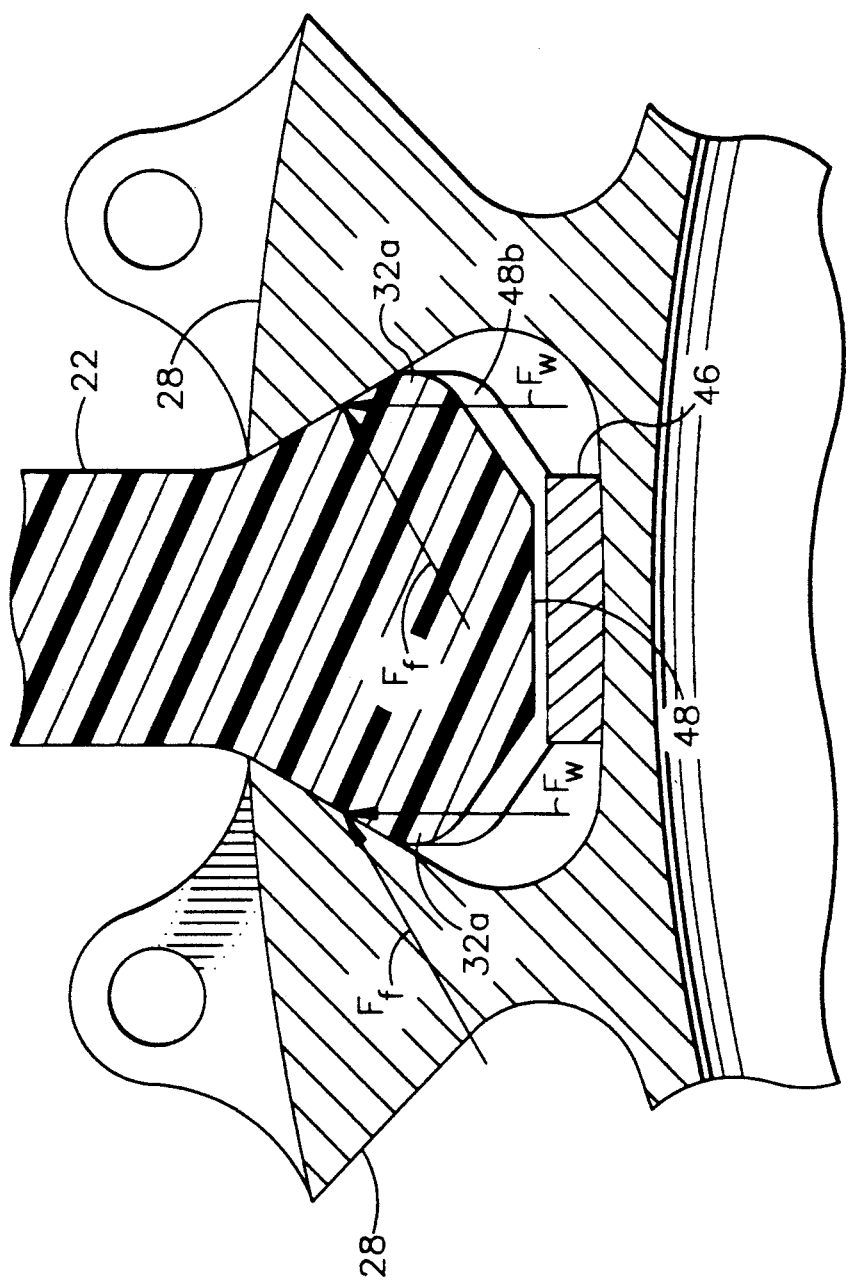
FIG. 5 is a transverse, partly sectional view of the retention assembly illustrated in FIG. 4 taken along line 5—5.
Figure 6:
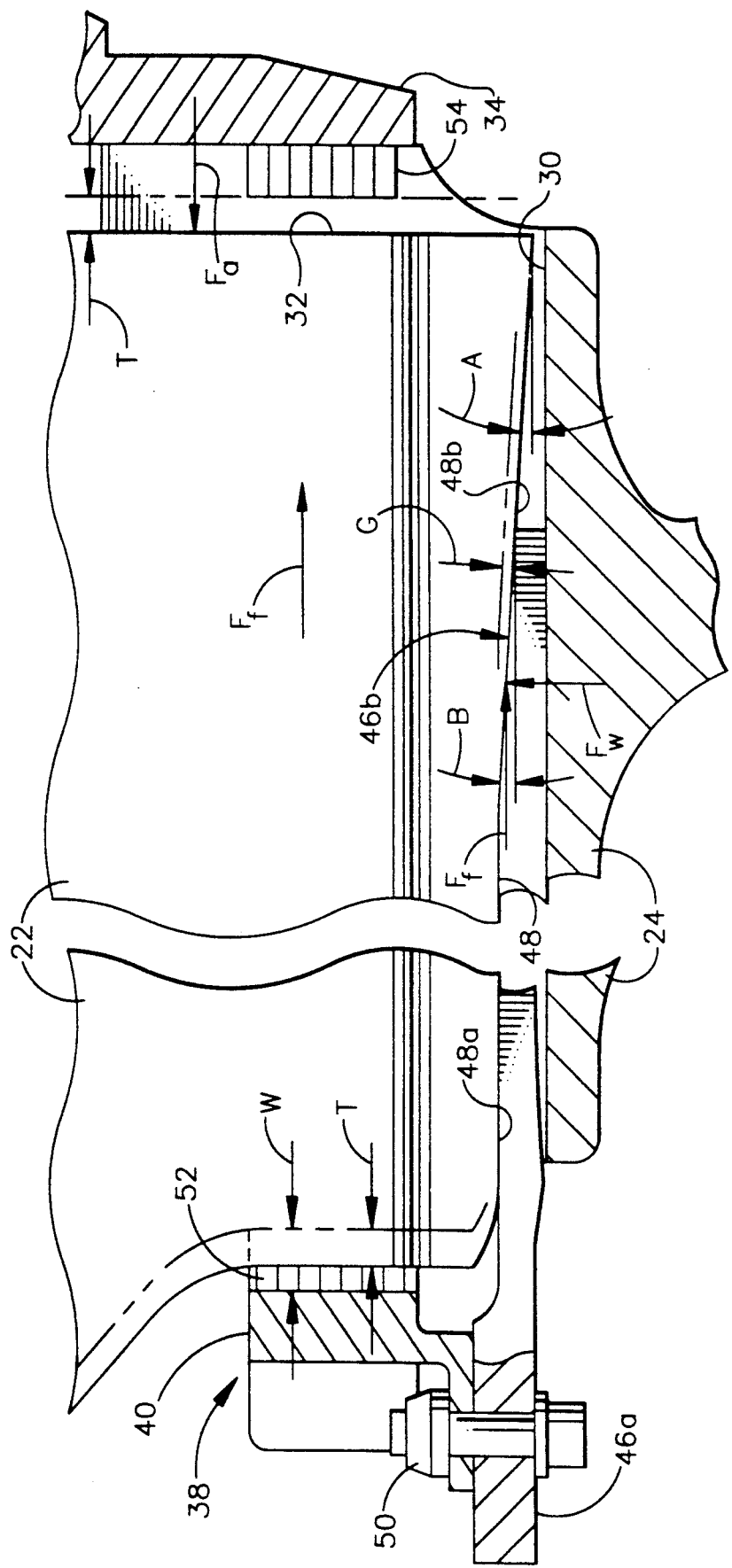
FIG. 6 is an enlarged axial sectional view showing in more particularity the forward and aft ends of the retention assembly illustrated in FIG. 4.

The secondary blade retainer or means 44 includes an elongate spacer 46 as shown in FIGS. 3-6 which cooperates with the radially inwardly facing base or bottom 48 of the dovetail 32 for restraining axial forward movement of the blade 22. As shown in FIG. 4, the dovetail 32 has a forward end facing in the axially upstream direction adjacent to the retention plate 40, and an aft end facing in an axially downstream direction adjacent to the aft blade retainer 34. The dovetail base 48 includes a flat forward portion 48a spaced radially outwardly from and parallel to the bottom of the dovetail groove 30, and an aft portion in the form of a first wedge 48b inclined radially inwardly from the forward portion 48a at a first inclination angle A as shown in FIG. 6 relative to the horizontal forward portion 48a and the axial centerline axis 16 (see FIG. 1).

The spacer 46 includes a proximal end 46a fixedly joined to the disk 24 by being fixedly joined to the retention plate 40 by a bolt 50 in a conventional manner. The spacer 46 also includes a distal end in the form of a second wedge 46b inclined radially inwardly at a second inclination angle B as shown in FIG. 6 which is disposed in the dovetail groove 30 radially between the dovetail 32 and the disk 24. As shown in FIG. 3, each of the spacers 46 is inserted during assembly axially into its respective dovetail groove 30 between the dovetail 32 and the disk 24 and bolted to the retention plate 40 disposed in the disk post slots 42 for fixedly joining the spacer 46 to the disk 24. FIG. 4 illustrates the so installed spacer 46 relative to the original solid-line position of the fan blade 22. The second wedge 46b is spaced axially from the first wedge 48b in the first or upstream direction to define a predetermined gap G therebetween for allowing the predetermined travel T of the blade 22 in the first direction upon failure of the primary blade retainer 38, after which the first wedge 48b engages or abuts the second wedge 46b for restraining further axial movement of the blade 22 in the groove 30 in the first direction.

More specifically, FIG. 6 illustrates in more particularity the initial position of the fan blade 22 shown in phantom line, and an axially forward displaced position shown in solid line upon failure of the primary blade retainer 38 upon application of the impact applied force $F_a$. The primary blade retainer 38 may take any conventional form, and the failure thereof may be partial, or complete failure which would allow unrestrained axial ejection of the blade 22 from the groove 30 but for the present invention. In the preferred embodiment illustrated, the primary blade retainer 38 further includes a compressible or crushable forward pad 52 disposed axially between the retention plate 40 and the dovetail 32 for restraining axial movement of the blade 22 in the grooves 30. In one embodiment, the forward pad 52 may be in the form of a honeycomb structure having axially extending cells made from aluminum or titanium, for example, with an axial width W in its uncompressed normal state. In the event of a bird strike imposing the forwardly directed applied force $F_a$ on the blade 22, the forward pad 52 will crush for absorbing some of the impact energy, with the blade 22 sliding axially forward in the groove 30 for the predetermined axial travel T. Such sliding will dissipate additional energy through friction forces $F_f$ shown. In FIGS. 5 and 6 which are generated between the dovetail lobes 32a and the dovetail posts 28. The friction forces $F_f$ occur over the contact area between the lobes 32a and the posts 28 but are represented schematically by arrows. The arrows shown in FIGS. 5 and 6 represent the axial direction of the friction forces $F_f$.

Also in this exemplary embodiment, a crushable aft pad 54 as shown in FIG. 4 is disposed axially between the aft blade retainer 34 and the dovetail 32 in the event a rearwardly directed axial impact force is directed on the blade 22, with the aft pad 54 being similarly crushable for absorbing energy.

Crushing of the forward pad 52 absorbs a portion of the impact energy from the bird strike, for example, with the remaining portion of the energy therefrom being absorbed by operation of the secondary blade retainer 44. More specifically, the axial width W of the forward pad 52 as illustrated in FIG. 6 is preferably greater than the axial component of the gap G for allowing the first and second wedges 48b and 46b to engage each other upon the predetermined crushing travel T of the forward pad 52.

In the exemplary embodiment illustrated in FIG. 6, the first and second inclination angles A and B are substantially equal to each other, and the first and second wedges 48b and 46b are substantially parallel to each other. The inclination angles A and B are preferably acute angles selected for generating a radial wedge force $F_w$ between the first and second wedges 48b and 46b for wedging the dovetail 32 against the dovetail posts 28 (see also FIG. 5) to generate additional friction force $F_f$ against travel of the blade 22 in the first, upstream axial direction. The first and second angles A and B may have values up to about 10°, for example, to ensure both limited axially forward movement of the dovetail 32 and radially upward wedge force $F_w$ generation as the blade 22 is forced forwardly by the applied force $F_a$. The radial clearance component initially provided in the gap G will be eliminated as the first wedge 48b slides on the second wedge 46b generating the wedging force $F_w$. The friction forces $F_f$ will be generated between the first and second wedges 48b and 46b as well as between the dovetail lobes 32a and the dovetail posts 28 (see FIG. 5) for additionally dissipating the energy from the bird strike. Such shallow acute angles A and B ensure limited axial travel of the dovetail 32 for dissipating the bird strike energy by friction under the wedging force $F_w$, with the wedging force $F_w$ being reacted in the dovetail posts 28. In this way, all of the energy from the bird strike need not be accommodated solely by the primary blade retainer 38 as is conventionally done, but instead a significant portion of the energy is accommodated through the first and second wedges 48b, 46b, and more directly into the dovetail posts 28.

As shown in the embodiment illustrated in FIGS. 4 and 6, the first and second wedges 48b, 46b are preferably disposed adjacent the dovetail aft end and the spacer aft end away from the primary blade retainer 38. In this way, some of the applied force $F_a$ is reacted through the retention plate 40 of the primary blade retainer 44 into the forward end of the dovetail post 28, with the remaining portion of the applied force $F_a$ being reacted through the aft ends of the dovetail post 28 adjacent to the wedges 46b, 48b.

In order to dissipate additional energy from the applied force $F_a$, the spacer 46 may be formed of an extrudible material for dissipating energy by extrusion thereof upon engagement of the first wedge 48b with the second wedge 46b, and additional travel in the forward direction. For example, the spacer 46 may be formed of aluminum, polyurethane, or organic composite materials including carbon fibers, for example, which will plastically deform upon compression by the first wedge 48b as the wedging force $F_w$ is generated.

The spacer 46 illustrated in FIGS. 3 and 4, for example, may be in the form of a conventional anti-clank spring having the improved second wedge 46b thereon. In this form, the spacer 46 is generally sinusoidal in the radial direction so that when it is assembled into the dovetail groove 30, it imposes an initial radial force for preloading the dovetail lobes 32a against their respective dovetail posts 28 in a conventional manner. In this embodiment, the spacer 46 including the second wedge 46b may be formed of conventional metal providing the required elastic resiliency for performing the anti-clank function, while still developing the wedging force $F_w$ upon failure of the primary blade retainer 38.

Figure 7:
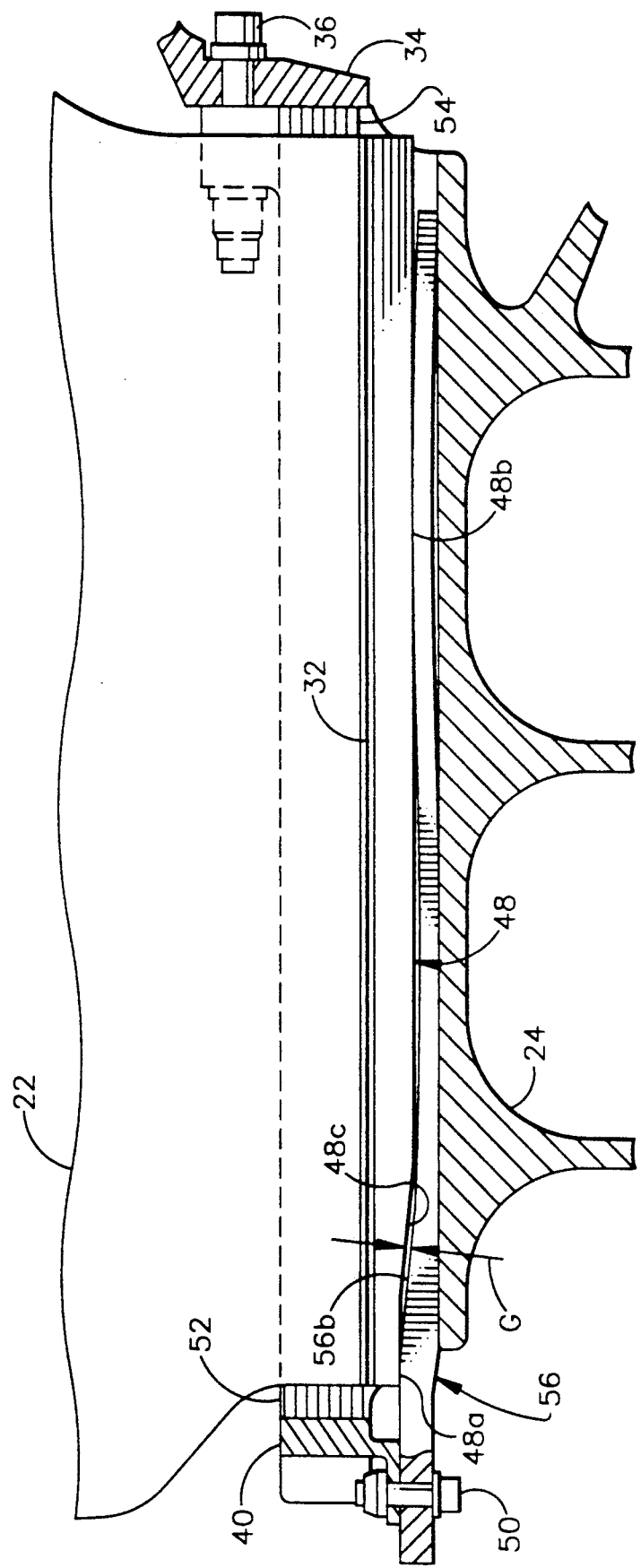
FIG. 7 is an axial, partly sectional view of a retention assembly in accordance with a second embodiment of the present invention.

Illustrated in FIG. 7 is an elongate spacer 56 which is substantially identical to the first embodiment of the spacer 46 disclosed above except that the second wedge 56b is disposed adjacent to the forward end of the dovetail 32, and the first wedge, designated 48c, of the dovetail base 48 is also disposed adjacent the forward end of the dovetail 32. The gap G is therefore also disposed at the forward end of the dovetail 32. Except for the location of the wedges 56b and 48c in the FIG. 7 embodiment of the invention, the structure and operation thereof is substantially identical to those of the wedges 46b and 48b of the first embodiment described above.

In both embodiments described above, the wedges on the dovetail base 48 and the spacers 46 and 56 may either be conventionally machined for providing the required inclination angles A and B or may be separate members fixedly joined thereto by welding, for example. In either case, the gap G ensures that the secondary blade retainer 44 is engaged only after failure of the primary blade retainer 38 by crushing of the forward pad 52, for example. Of course, the primary blade retainer 38 may take any conventional form, without the forward pad 52 for example, which upon failure thereof under the applied force $F_a$ will allow forward travel of the blade 22 which will be limited by the action of the first and second wedges 48b and 46b. In all cases, however, the resulting combination of primary and secondary blade retainers for reacting the applied force $F_a$ will result in a lighter weight assembly which more efficiently reacts the applied force $F_a$.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims; I claim:

1. A retention assembly for a rotor blade comprising:
   a rotor disk having a pair of circumferentially spaced apart dovetail posts defining therebetween an axially extending dovetail groove;
   said rotor blade having a dovetail being complementary to said dovetail groove and disposed therein for radial retention by said posts;
   a primary blade retainer fixedly joined to said disk for retaining said blade in said groove against axial movement in a first direction; and
   secondary means disposed in said groove and cooperating with said dovetail for wedging said blade in said groove after a predetermined axial travel of said blade in said first direction upon failure of said primary blade retainer to restrain said predetermined travel.

2. An assembly according to claim 1 wherein said secondary means comprise:
   said dovetail including a radially inwardly facing base having a first wedge inclined radially inwardly therefrom at a first inclination angle; and
   an elongate spacer having a proximal end fixedly joined to said disk, and a second wedge disposed in said groove radially between said dovetail and said disk, said second wedge being inclined radially inwardly at a second inclination angle and being spaced axially from said first wedge in said first direction to define a predetermined gap therebetween for allowing said predetermined travel of said blade in said first direction upon failure of said primary blade retainer after which said first wedge engages said second wedge for restraining further axial movement of said blade in said groove in said first direction.

3. An assembly according to claim 2 wherein said first and second inclination angles are substantially equal, and said first and second wedges are substantially parallel to each other.

4. An assembly according to claim 3 wherein said first and second inclination angles are acute angles selected for generating a radial wedge force between said first and second wedges for wedging said dovetail against said posts to generate friction force against travel of said blade in said first direction.

5. An assembly according to claim 4 wherein said first and second inclination angles have values up to about 10°.

6. An assembly according to claim 4 wherein said primary blade retainer comprises:
   a retention plate fixedly joined to said dovetail posts, and fixedly joined to said spacer proximal end;
   a crushable pad disposed between said retention plate and said dovetail for restraining axial movement of said blade in said groove; and
   said pad having an axial width greater than said predetermined gap for allowing said first and second wedges to engage each other upon a predetermined amount of crushing of said pad.

7. An assembly according to claim 4 wherein:
   said first direction is an axially upstream direction;
   said dovetail has a forward end facing in said axially upstream direction, and an aft end facing in an axially downstream direction; and
   said first and second wedges are disposed adjacent to said dovetail aft end.

8. An assembly according to claim 4 wherein:
   said first direction is an axially upstream direction;
   said dovetail has a forward end facing in said axially upstream direction, and an aft end facing in an axially downstream direction; and
   said first and second wedges are disposed adjacent to said dovetail forward end.

9. An assembly according to claim 4 wherein said spacer is formed of an extrudible material for dissipating energy by extrusion thereof upon engagement of said first wedge with said second wedge and travel in said first direction.

* * * * *